US010179863B2

(12) United States Patent
Ohashi et al.

(10) Patent No.: US 10,179,863 B2
(45) Date of Patent: *Jan. 15, 2019

(54) INK JET RECORDING METHOD AND RECORDING APPARATUS

(71) Applicant: Seiko Epson Corporation, Tokyo (JP)

(72) Inventors: Masakazu Ohashi, Shiojiri (JP); Toru Saito, Yamagata (JP); Tomoki Shinoda, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,880

(22) Filed: Apr. 27, 2017

(65) Prior Publication Data

US 2017/0226359 A1     Aug. 10, 2017

Related U.S. Application Data

(63) Continuation of application No. 14/526,882, filed on Oct. 29, 2014, now Pat. No. 9,663,672.

(30) Foreign Application Priority Data

Oct. 31, 2013  (JP) .................................. 2013-226550

(51) Int. Cl.
*B41J 2/01*       (2006.01)
*C09D 11/322*     (2014.01)
(Continued)

(52) U.S. Cl.
CPC .............. *C09D 11/322* (2013.01); *B41J 2/01* (2013.01); *C08K 5/5419* (2013.01); *C09D 11/10* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,510,415 A * 4/1996 Zahrobsky ................ D06P 1/44
                                                 347/100
8,118,424 B2 * 2/2012 Irita ....................... C09D 11/40
                                                 347/100

(Continued)

FOREIGN PATENT DOCUMENTS

WO    WO-2007-035508 A1    3/2007

OTHER PUBLICATIONS http://www.image-specialists.com/ink_int_injet_printer.aspx (retrieved Sep. 26, 2016).*

*Primary Examiner* — Manish S Shah
(74) *Attorney, Agent, or Firm* — Harness, Dickey & Pierce, P.L.C.

(57) ABSTRACT

An ink jet recording method includes first attaching an ink composition to fabric so as to have an attached amount of 10 mg/inch$^2$ to 30 mg/inch$^2$, and second attaching the ink composition to the fabric so as to have an attached amount of 90 mg/inch$^2$ to 250 mg/inch$^2$, in which the ink composition includes a pigment and a resin dispersion, and a content of a resin included in the resin dispersion is 0.5 parts by mass to 2.5 parts by mass with respect to 1 part by mass of the pigment.

10 Claims, 1 Drawing Sheet

(51) Int. Cl.
*C09D 175/04* (2006.01)
*C08K 5/5419* (2006.01)
*C09D 11/10* (2014.01)
*D06P 5/30* (2006.01)
*C09D 11/102* (2014.01)
*C09D 11/106* (2014.01)
*C09D 11/107* (2014.01)
*C09D 123/08* (2006.01)
*C09D 133/00* (2006.01)
*D06P 5/20* (2006.01)
*D06M 11/83* (2006.01)
*D06P 1/44* (2006.01)
*D06P 1/52* (2006.01)

(52) U.S. Cl.
CPC .......... *C09D 11/102* (2013.01); *C09D 11/106* (2013.01); *C09D 11/107* (2013.01); *C09D 123/0853* (2013.01); *C09D 133/00* (2013.01); *C09D 175/04* (2013.01); *D06M 11/83* (2013.01); *D06P 5/2077* (2013.01); *D06P 5/30* (2013.01); *D06P 1/44* (2013.01); *D06P 1/5207* (2013.01); *D06P 1/5285* (2013.01)

(58) Field of Classification Search
CPC ...... B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04586; B41J 2/04595; B41J 2/04588; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | |
|---|---|---|---|
| 2005/0182154 A1* | 8/2005 | Berge | B41J 2/01 523/160 |
| 2007/0056118 A1* | 3/2007 | Ellis | C09D 11/322 8/115.51 |
| 2013/0249996 A1* | 9/2013 | Saito | B41J 2/2107 347/21 |

\* cited by examiner

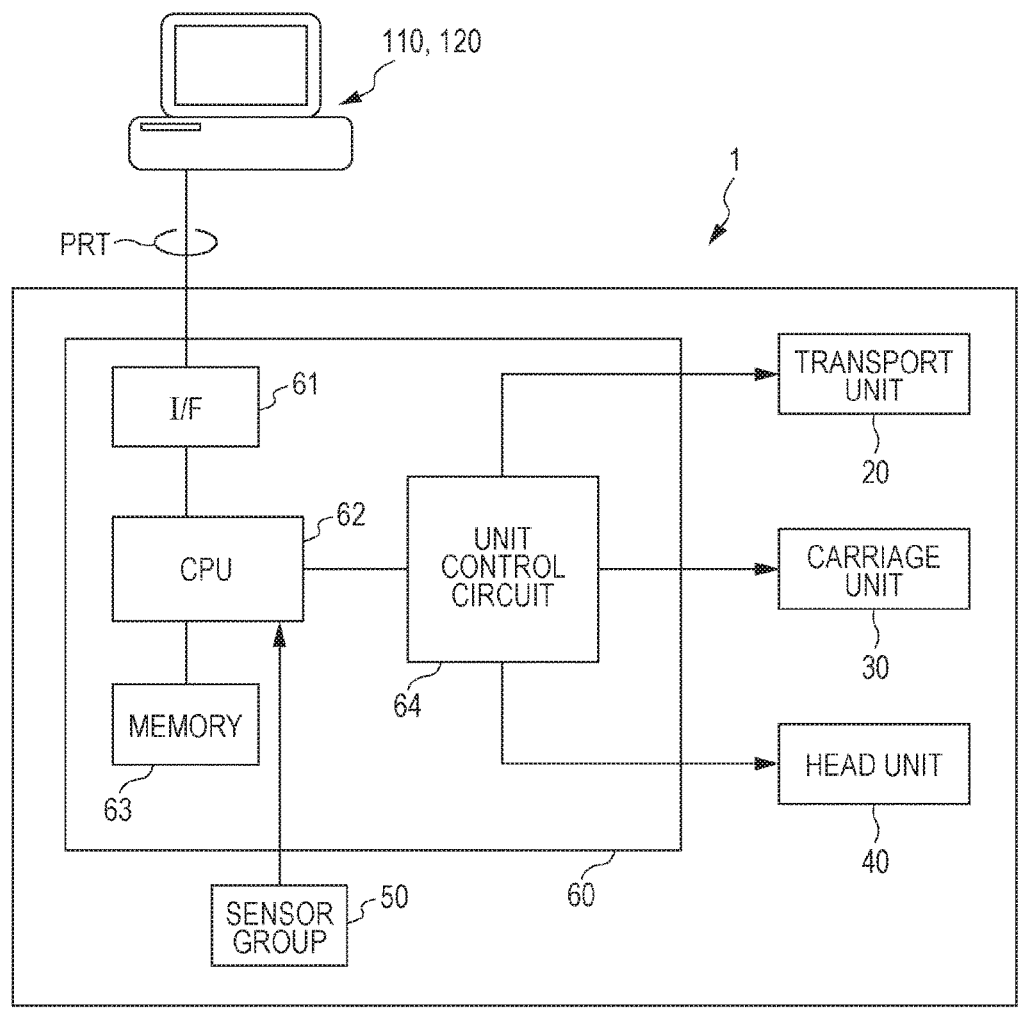

INK JET RECORDING METHOD AND RECORDING APPARATUS

CROSS-REFERENCE TO RELATED APPLICATIONS

This application is a continuation of U.S. patent application Ser. No. 14/526,882 filed on Oct. 29, 2014 which claims priority to Japanese Patent Application No. 2013-226550, filed on Oct. 31, 2013, both of which are hereby expressly incorporated by reference herein in their entireties.

BACKGROUND

1. Technical Field

The present invention relates to an ink jet recording method and a recording apparatus.

2. Related Art

Ink jet recording methods are able to record a highly fine image with a relatively simple apparatus and have been rapidly developed in various fields. Among these methods, an ink jet recording method using fabric as a medium to be recorded has been variously investigated. For example, International Publication No. 2007/035508 discloses a printing method for realizing high quality ink jet printing on fabric such as cotton and a silk blended fabric. In addition, in International Publication No. 2007/035508, it is disclosed that while the amount of applied ink is 5 g/m$^2$ to 17 g/m$^2$ when an image such as a letter or a picture is recorded, the amount of an ink composition attached to the fabric when a background image or the like is recorded to record a color image is approximately 5 g/m$^2$ to 300 g/m$^2$.

As described in International Publication No. 2007/035508, when a background image or the like is recorded, a large amount of the ink composition is used from the viewpoint that the base color of a recording medium is not exposed (concealment is secured), and when an image such as a letter or a picture is recorded, a small amount of the ink composition is used. However, as the amount of the ink composition attached to the fabric increases, cracks tend to be easily generated in a recorded matter obtained when the fabric is heated and dried, and as the amount of the ink composition decreases, the washing resistance tends to be deteriorated. In order to reduce cracks so as to improve durability (washing resistance) when the recorded matter is washed, the optimization of the ink composition according to the attached amount has been considered. However, when ink compositions of the same colors are independently prepared according to the attached amount, problems arise from the viewpoint of reducing costs and achieving space saving of a recording apparatus. Therefore, even when different amounts of the same attached ink composition is used, an ink jet recording method capable of reducing cracks so as to improve washing resistance has been desired.

SUMMARY

An advantage of some aspects of the invention is to provide an ink jet recording method capable of realizing a recorded matter in which washing resistance is high and cracks are unlikely to be generated.

The inventors have conducted intensive studies. As a result, it has been found that the use of an ink composition having a predetermined composition can solve the above problems by setting the amount of the ink composition attached to fabric within a predetermined range, and thus, the invention has been accomplished.

That is, aspects of the invention are as follows.

[1] According to an aspect of the invention, there is provided an ink jet recording method performed by using an ink jet recording apparatus including an ink composition, including first attaching the ink composition to fabric so as to have an attached amount of 10 mg/inch$^2$ to 30 mg/inch$^2$, and second attaching the ink composition to the fabric so as to have an attached amount of 90 mg/inch$^2$ to 250 mg/inch$^2$, in which the ink composition includes a pigment and a resin dispersion, and a content of a resin included in the resin dispersion is 0.5 parts by mass to 2.5 parts by mass with respect to 1 part by mass of the pigment.

[2] In the ink jet recording method according to [1], the pigment may include inorganic metal fine particles, and a content of the pigment may be 5% by mass to 15% by mass with respect to a total amount of the ink composition.

[3] In the ink jet recording method according to [1] or [2], the resin included in the resin dispersion may include a resin having a glass transition temperature of −45° C. to 0° C.

[4] In the ink jet recording method according to any one of [1] to [3], the resin dispersion may include one or more resins selected from the group consisting of an acrylic resin and a urethane resin, and the content of the resin included in the resin dispersion may be 3.5% by mass to 30% by mass with respect to the total amount of the ink composition.

[5] In the ink jet recording method according to any one of [1] to [4], the content of the resin included in the resin dispersion may be 1.0 part by mass to 2.5 parts by mass with respect to 1 part by mass of the pigment.

[6] In the ink jet recording method according to any one of [1] to [5], the ink composition may further include an organic solvent having a boiling point of 250° C. or higher.

[7] The ink jet recording method according to any one of [1] to [6] may further include applying a reaction solution to at least a region of the fabric to which the ink composition is attached before the first attaching of the ink composition or the second attaching of the ink composition is performed.

[8] In the ink jet recording method according to [7], a residual amount of a volatile component in the reaction solution per unit area of the region of the fabric to which the reaction solution is applied may be 30% by mass or less with respect to a total amount of the volatile component included in the reaction solution applied per unit area of the region of the fabric after the applying of the reaction solution in the first attaching of the ink composition and the second attaching of the ink composition.

[9] In the ink jet recording method according to [7] or [8], the reaction solution may include one or more flocculants selected from the group consisting of a polyvalent metal salt and an organic acid.

[10] The ink jet recording method according to any one of [1] to [9] may further include heating and drying the fabric after the first attaching of the ink composition or the second attaching of the ink composition.

[11] The ink jet recording method according to any one of [1] to [10] may further include third attaching a second ink composition including one or more pigments selected from the group consisting of a color pigment and a black pigment to at least a part of the region of the fabric to which a first ink composition is attached in the second attaching of the ink composition while the ink composition is used as the first ink composition.

[12] The ink jet recording method according to [11] may further include an attachment process (1) of performing the second attaching of the ink composition rather than performing the third attaching of the second ink composition, and an attachment process (2) of performing the second attaching of the ink composition and the third attaching of the second ink composition, and an amount of the first ink composition attached to the fabric in the second attaching of the ink composition of the attachment process (1) may be larger than an amount of the first ink composition attached to the fabric in the second attaching of the ink composition of the attachment process (2).

[13] In the ink jet recording method according to [11] or [12], the first ink composition may include inorganic metal fine particles as the pigment and an organic solvent having a boiling point of 250° C. or higher, and the second ink composition may further include an organic solvent having a boiling point of 250° C. or higher.

[14] An ink jet recording apparatus which performs recording according to the ink jet recording method according to any one of [1] to [13].

BRIEF DESCRIPTION OF THE DRAWING

The invention will be described with reference to the accompanying drawing, wherein like numbers reference like elements.

FIGURE is an example of a block diagram showing an overall configuration of an ink jet recording apparatus (as a whole).

DESCRIPTION OF EXEMPLARY EMBODIMENTS

Hereinafter, embodiments for carrying out the invention (hereinafter, referred to as "embodiments") will be described in detail while referring to the drawing as required. However, the invention is not limited to the embodiment and various modifications can be made within the range not departing from the gist of the invention. In the drawing, the same symbols are attached to the same components and description thereof will be omitted. Further, a size ratio in the drawing is not limited to a ratio shown in the drawing. In the specification, "(meth)acryl" refers to "acryl" and "methacryl" corresponding thereto, and "(meth)acrylate" refers to "acrylate" and "methacrylate" corresponding thereto.

Ink Jet Recording Method

An ink jet recording method according to the embodiment includes first attaching an ink composition to fabric so as to have an attached amount of 10 mg/inch$^2$ to 30 mg/inch$^2$, and second attaching the ink composition to the fabric so as to have an attached amount of 90 mg/inch$^2$ to 250 mg/inch$^2$. The ink composition includes a pigment and a resin dispersion, and a content of a resin included in the resin dispersion is 0.5 parts by mass to 2.5 parts by mass with respect to 1 part by mass of the pigment.

When recording is usually performed on a medium to be recorded such as fabric using an ink composition for pigment printing, before a color image is recorded, a background image of a white ink or the like is recorded onto the medium to be recorded to conceal another color of the medium, and a color image is recorded on the background image in some cases. From the viewpoint of securing concealment, the amount of the ink composition attached to the medium to be recorded when the background image is recorded is set to be larger than the amount of the ink composition attached to the medium to be recorded when the color image is recorded. However, as the amount of the ink composition attached to the medium to be recorded increases, cracks tend to be easily generated when the attached ink composition is heated and dried.

On the other hand, when an image such as a letter and a picture is formed, the amount of the ink composition attached to the medium to be recorded is decreased from the viewpoint of reducing costs or the like. However, as the amount of the ink composition attached to the medium decreases, the amount of a fixing resin attached also decreases at the same time. Thus, the washing resistance tends to be deteriorated.

Moreover, from the viewpoint of reducing a recording cost and achieving space saving of a recording apparatus, even when the attached amount is changed, it is possible to obtain a high quality recorded matter, in which cracks are unlikely to be generated and the washing resistance is high, using the ink composition of the same color and the same composition.

Concerning this point, in the ink jet recording method of the embodiment, even when the amount of the attached ink composition is a relatively small amount of 10 mg/inch$^2$ to 30 mg/inch$^2$, a content ratio of the pigment and the resin included in the resin dispersion is within a predetermined range, and thus, it is possible to obtain a recorded matter having high washing resistance. In addition, even when the amount of the attached ink composition is a relatively large amount of 90 mg/inch$^2$ to 250 mg/inch$^2$, a content ratio of the pigment and the resin included in the resin dispersion is within a predetermined range, and thus, it is possible to obtain a recorded matter in which cracks are unlikely to be generated. In the ink jet recording method of the embodiment, first and second attachment processes may be performed in a case in which the first and second attachment processes are performed on one medium to be recorded and also, the first attachment process may be performed on one medium to be recorded and the second attachment process may be performed on another medium to be recorded. Further, the first and second attachment processes may be performed not only in a case in which an image such as a letter or a picture and a background image are recorded and but also in a case in which an image having a relatively low density and an image having a relatively high density are recorded. For example, the image recorded by the second attachment process may be an image such as a letter or a picture having a relatively high density.

First Attachment Process

A first attachment process is a process of attaching a predetermined amount of a first ink composition to fabric. The amount of the ink composition attached in the first attachment process is 10 mg/inch$^2$ to 30 mg/inch$^2$, and preferably 15 mg/inch$^2$ to 25 mg/inch$^2$. When the amount of the ink composition attached in the first attachment process is 10 mg/inch$^2$ or more, the washing resistance is improved, and thus, the color developability of an image is improved. Further, when the amount of the ink composition attached in the first attachment process is 30 mg/inch$^2$ or less, the reproducibility of the density of an image to be recorded and the recording rate of an image to be recorded are more excellent.

In each process of the ink jet recording method of the embodiment, the attached amount is appropriately adjusted by the amount of ink attached according to the density of an image to be recorded. The adjustment of the attached amount is not limited to a case in which the attached amount is controlled and adjusted by the value of the attached amount during recording, and may include a case in which the attached amount is adjusted by values of dot formation density (the number of dots formed per unit area of the medium to be recorded) in which the attached amount is controlled according to the color or density of an image to be recorded, the amount of ink per dot, and the like, so as to have a predetermined amount of ink attached.

The first attachment process is not particularly limited. The first attachment process may be performed to directly form an image on the medium to be recorded or may be performed to form an image on a background image formed on the medium to be recorded.

Second Attachment Process

A second attachment process is a process of attaching a predetermined amount of the first ink composition to the fabric. The amount of the ink composition attached in the second attachment process is 90 mg/inch$^2$ to 250 mg/inch$^2$. The lower limit thereof is preferably 100 mg/inch$^2$ or more, more preferably 130 mg/inch$^2$ or more, and still more preferably 150 mg/inch$^2$ or more from the viewpoint of achieving more excellent image concealment. On the other hand, the upper limit thereof is preferably 230 mg/inch$^2$ or less, more preferably 200 mg/inch$^2$ or less, still more preferably 170 mg/inch$^2$ or less, and particularly preferably 150 mg/inch$^2$ or less from the viewpoint of achieving more excellent crack resistance. When the amount of the ink composition attached in the second attachment process is 90 mg/inch$^2$ or more, the concealment of a recorded matter to be obtained is improved and thus, the color developability of an image obtained when the image is used as a background image and another image is formed on the background image is further improved. In addition, when the amount of the ink composition attached in the second attachment process is 250 mg/inch$^2$ or less, crack generation can be suppressed in a recorded matter to be obtained and wasteful ink composition consumption can be suppressed. Thus, a time required for recording can be shortened.

The second attachment process is not particularly limited. The second attachment process may be performed to form a background image with another ink composition on the medium to be recorded or may be performed to directly form an image on the medium to be recorded. In addition, an image region recorded in the second attachment process may be a background image on which an image is to be recorded with another ink composition may be an image on which an image is not to be recorded with another ink composition.

The ink jet recording method of the embodiment may further include at least any one of an attachment process in which the amount of the ink composition attached when the ink composition is attached to the fabric is less than 10 mg/inch$^2$, an attachment process in which the amount of the ink composition attached is more than 30 mg/inch$^2$ and less than 90 mg/inch$^2$, and an attachment process in which the amount of the ink composition attached is more than 250 mg/inch$^2$. Particularly, the ink jet recording method may further include an attachment process in which the amount of the ink composition attached is more than 30 mg/inch$^2$ and less than 90 mg/inch$^2$.

Third Attachment Process

The ink jet recording method of the embodiment preferably includes a third attachment process of attaching a second ink composition including one or more pigments selected from the group consisting of a color pigment and a black pigment to at least a part of a region of the medium to be recorded to which the first ink composition is attached in the second attachment process. In the third attachment process, since the second ink composition is attached to at least a part of a region of the medium to be recorded to which the first ink composition is attached, for example, an image formed by laminating the image formed with the second ink composition on the background image formed with the first ink composition and the image formed with the first ink composition can be formed on the medium to be recorded. When the ink jet recording method includes the third attachment process, the color developability of an image to be obtained tends to be improved.

When the second ink composition is laminated on the first ink composition as in the third attachment process, the second ink composition is cracked and the color of the first ink composition is remarkable. Particularly, when a total amount of the ink composition attached to the medium to be recorded increases, crack resistance tends to be deteriorated. However, cracks can be sufficiently prevented from being generated by the ink jet recording method of the embodiment.

The amount of the second ink composition attached in the third attachment process is preferably 10 mg/inch$^2$ to 30 mg/inch$^2$, and more preferably 15 mg/inch$^2$ to 25 mg/inch$^2$. When the amount of the second ink composition attached in the third attachment process is 10 mg/inch$^2$ or more, the washing resistance is improved and the color developability of an image tends to be further improved. In addition, when the amount of the second ink composition in the third attachment process is 30 mg/inch$^2$ or less, the reproducibility of the color or density of an image to be recorded tends to be more excellent.

The ink jet recording method includes an attachment process (1) of performing the second attachment process rather than performing the third attachment process, and an attachment process (2) of performing the second attachment process and the third attachment process, and an amount of the first ink composition attached to the fabric used in the second attachment process of the attachment process (1) is preferably larger than an amount of the first ink composition attached to the fabric used in the second attachment process of the attachment process (2). Thus, the washing resistance is improved and the color developability of an image tends to be improved and be more excellent. Particularly, even when an attachment process such as the second attachment process (2) is performed, the washing resistance is further improved. The attachment amount is an attachment amount per unit area, such as mg/inch$^2$, of the attachment region of the medium to be recorded by the attachment process. Both the attachment process (1) and the attachment process (2) may be performed on one medium to be recorded, and the attachment process (1) may be performed on one medium to be recorded and the attachment process (2) may be performed on another medium to be recorded similar to the above-described relationship between the first attachment process and the second attachment process.

Reaction Solution Applying Process

The ink jet recording method of the embodiment preferably further includes a reaction solution applying process of applying a reaction solution to at least a region of the fabric to which the first ink composition is attached before the first attachment process or the second attachment process. When the reaction solution applying process is performed at this time, it is possible to prevent the pigment from infiltrating into the medium to be recorded such as fabric or spreading on the medium to be recorded in each attachment process to be performed subsequently. As a result, the color developability of an image to be obtained is improved and bleeding also tends to be further suppressed. Further, since the reaction solution has a function of flocculating the pigment in the ink composition, the ink composition of an image to be obtained becomes relatively hard and there is a concern of cracks being generated in the image. Thus, the effect of the invention can be exhibited advantageously. The reaction solution applying process can be performed before the third attachment process and other attachment processes.

A method of applying the reaction solution to the fabric is not particularly limited. For example, roller coating, spray coating, ink jet coating, or the like can be used. The ink jet recording method of the embodiment may further include a process of drying at least some of the reaction solution applied to the medium to be recorded during the reaction solution applying process or after the reaction solution applying process.

The amount of the reaction solution applied to the medium to be recorded is preferably 0.1 g/inch$^2$ to 1 g/inch$^2$, and more preferably 0.2 g/inch$^2$ to 0.6 g/inch$^2$. When the amount of the reaction solution applied is within the above range, the color developability of a recorded matter to be obtained is further improved and bleeding also tends to be further suppressed.

After the reaction solution applying process, the residual amount of a volatile component in the reaction solution per unit area of the region of the fabric to which the reaction solution is applied, with respect to a total amount of the volatile component included in the reaction solution attached per unit area of the region of the fabric, is 30% by mass or less. Then, any one of the first attachment process and the second attachment process is preferably performed. In this case, the residual amount of a volatile component is preferably 20% by mass or less, and more preferably 10% by mass or less. When the reaction solution applying process is performed at this time, the reaction in which the reaction solution flocculates the pigment in the ink composition proceeds more favorably. Thus, the color developability of an image to be obtained is further improved, bleeding tends to be further suppressed, and cracks tend to be further reduced. On the other hand, in a wet-on-wet method in which the ink composition is attached before the reaction solution is fully dried, after the reaction solution is applied, the time for drying the reaction solution can be shortened or the drying of the reaction solution can be omitted, and thus, the ink composition can be attached at the early stage. Accordingly, while a recording time tends to be shortened, the reaction solution is rapidly heated and dried in a state in which the reaction solution includes a large amount of non-volatile components in the wet-on-wet method, and thus, cracks tend to be easily generated. Therefore, the application of the invention is particularly useful. In this case, any one of the first attachment process and the second attachment process is preferably performed in a state in which the attachment amount is more than 30% by mass, more preferably in a state in which the attachment amount is 50% by mass or more, and still more preferably in a state in which the attachment amount is 70% by mass or more.

Heating and Drying Process

The ink jet recording method of the embodiment preferably further includes a heating and drying process of heating and drying the fabric after any one of the first attachment process and the second attachment process is performed. In addition, the ink jet recording method of the embodiment preferably includes a heating process of performing heating treatment on the medium to be recorded during one process of the reaction solution applying process, the first, second, and third attachment processes, and other attachment processes in the ink jet recording method of the embodiment, as well as after any one of the first attachment process and the second attachment process, after these processes, or between each process, as required. The resin included in the ink composition can be more strongly fused on the surface of the medium to be recorded or moisture included in the reaction solution or the ink composition can evaporate rapidly by the heating treatment. By performing such heating treatment, the abrasion resistance of an image to be obtained tends to be more excellent. When the ink jet recording method includes the heating and drying process, the fabric can be dried in a relatively short period of time compared to when being dried at room temperature, and thus, bleeding tends to be further prevented. Further, when the ink jet recording method includes the heating and drying process, the problem that cracks are more likely to be generated arises compared to when the fabric is dried at room temperature. Thus, the application of the invention is advantageous.

A method of heating and drying the fabric is not particularly limited. Examples thereof include oven drying, heating on a hot plate, a heat press method, an atmospheric pressure steam method, a high pressure steam method, and a thermofix method. In addition, although a heat source for heating is not particularly limited, the examples thereof include an infrared ray (lamp). Further, the temperature during the heating treatment may be appropriately set as long as it is possible to fuse the resin which can be included in the ink composition and evaporate the moisture, and is preferably 150° C. or higher, and more preferably about 150° C. to 200° C. When the temperature during the heat treatment is within the above range, abrasion resistance tends to be improved.

After each attachment process, the medium to be recorded may be washed with water and dried. At this time, soaping treatment, that is, treatment for rinsing unfixed pigment with a heated saponated solution may be performed as required.

Medium to be Recorded

Next, the medium to be recorded of the embodiment will be described. The medium to be recorded used in the recording method of the embodiment is fabric. The material of the fabric is not limited to the following examples, and examples thereof include natural fibers such as silk, cotton, wool, nylon, polyester, and rayon, and synthetic fibers. Among these examples, cotton is preferable since cotton has a resistance against fixation of the ink composition at a high temperature.

First Ink Composition

Hereinafter, the first ink composition will be described. The first ink composition includes a pigment, a resin dispersion, and an arbitrary component as required.

Pigment

The pigment in the first ink composition is not particularly limited and examples thereof include inorganic metal fine particles, a color pigment, a black pigment, and the like. Among the examples, inorganic metal fine particles are preferable. Since the inorganic metal fine particles have a relatively large particle size compared to other pigments, the concealment of an image to be obtained can be increased. In addition, generally, when the inorganic metal fine particles having a relatively large particle size are used, the washing resistance tends to be deteriorated. Thus, the use of the invention is particularly advantageous.

The inorganic metal fine particles are not particularly limited and examples thereof include metal oxides such as titanium dioxide, zinc oxide, silica, alumina, and magnesium oxide, used in a white ink; white pigments of metal compounds such as barium sulfate and calcium carbonate; and metal pigments made of aluminum, silver, gold, iron, nickel or an alloy thereof, used in a metal ink.

In addition, when it comes to each color, examples of carbon black used in a black ink include No. 2300, No. 900, MCF88, No. 33, No. 40, No. 45, No. 52, MA7, MA8, MA100, and No. 2200 B (all manufactured by Mitsubishi Chemical Corporation); Raven 5750, Raven 5250, Raven 5000, Raven 3500, Raven 1255, and Raven 700 (all manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by Cabot Japan K.K.); Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all manufactured by Degussa).

Examples of the pigment used in a white ink include C.I. Pigment White 6, 18, and 21.

Examples of the pigment used in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment used in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of the pigment used in a cyan ink include C.I. Pigment Blue 1, 2, 3, 15, 15:1, 15:2, 15:3, 15:34, 15:4, 16, 18, 22, 25, 60, 65, and 66; and C.I. Vat Blue 4 and 60.

In addition, examples of pigments other than the magenta, cyan and yellow pigments include C.I. Pigment Green and 10; C.I. Pigment Brown 3, 5, 25, and 26; and C.I. Pigment Orange 1, 2, 5, 7, 13, 14, 15, 16, 24, 34, 36, 38, 40, 43, and 63.

These pigments may be used singly or in a combination of two or more kinds thereof.

The average particle size (outer diameter) of the pigment is preferably 30 nm to 600 nm, and more preferably 200 nm to 400 nm. When the average particle size of the pigment is 600 nm or less, sedimentation of the particles can be prevented and the dispersion stability is further improved. In addition, clogging of an ink jet recording head or the like is prevented and thus, the reliability tends to be further improved. Further, when the average particle size of the pigment is 30 nm or more, the concealment tends to be further improved.

The average particle size of the pigment can be measured by a particle size distribution analyzer employing a laser diffraction scattering method as the measurement principle. For example, as a laser diffraction scattering particle analyzer, a particle size distribution analyzer employing a dynamic light scattering method as the measurement principle (for example, "Microtrac UPA", manufactured by Nikkiso Co., Ltd.) can be used.

The content of the pigment in the first ink composition is preferably 2% by mass to 20% by mass, more preferably 5% by mass to 15% by mass, and still more preferably 7% by mass to 14% by mass with respect to the total amount of the first ink composition. When the content of the pigment in the first ink composition is 2% by mass or more, the concealment and the washing resistance of an image tend to be more excellent. In addition, when the content of the pigment in the first ink composition is 20% by mass or less, the crack resistance tends to be more excellent.

Resin Dispersion

The resin dispersion in the first ink composition has a function of fixing the pigment to the medium to be recorded. The resin included in the resin dispersion in the first ink composition is not particularly limited and examples thereof include an acrylic resin, a urethane resin, and a vinyl-based resin such as vinyl acetate/ethylene resin. Among these examples, one or more resins selected from the group consisting of an acrylic resin and a urethane resin are preferable. When the acrylic resin is used, the crack resistance becomes more excellent and when the urethane resin is used, the washing resistance becomes more excellent.

The resin dispersion is not particularly limited and for example, any of an emulsion type in which resin particles are dispersed in a solvent and a solution type in which resin is dissolved in a solvent may be used. Of the two, an emulsion type is preferably used from the viewpoint of achieving more excellent washing resistance and concealment of the image. In addition, the emulsion type can be classified into a forced emulsification type and a self-emulsification type in accordance with the emulsification method, and a self-emulsification type is preferably used. Since a self-emulsification type dispersion is excellent in film formation properties and moisture resistance compared to a forced emulsification type dispersion, a film having resistance against water can be formed, and a moisturizing agent containing moisture can be prevented from entering a background image.

Acrylic Resin

The acrylic resin is not particularly limited and examples thereof include a homopolymer of a monomer which is (meth)acrylate or (meth)acrylic ester or a copolymer of at least one of (meth)acrylate and (meth)acrylic ester with other monomers. Other monomers are not particularly limited and examples thereof include (meth)acrylonitrile, cyano (meth)acrylate, (meth)acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride. Among these examples, a copolymer of at least one of (meth)acrylate and (meth) acrylic ester with other monomers is preferable, a styrene-(meth)acrylate copolymer is more preferable, and a styrene-acrylate copolymer-based resin is still more preferable. The above copolymer may be in any form of a random copolymer, a block copolymer, an alternating copolymer, and a graft copolymer.

As the acrylic resin emulsion, an emulsion obtained by using known materials and production methods may be used or commercially available products may be used. Commercially available products are not particularly limited and examples thereof include Movinyl 966A and Movinyl 7320 (manufactured by Nippon Synthetic Chemical Industry Co., Ltd.), UC-3510 (manufactured by Toagosei Company, Limited), Vinyblan 2080 (manufactured by Nissin Chemical Industry CO., Ltd.), and NK binder R-5HN (manufactured by Shin-Nakamura Chemical Co., Ltd.). However, commercially available products are not limited to the above examples.

When the acrylic resin is used as the resin included in the resin dispersion, the glass transition temperature (Tg) thereof is not particularly limited. The glass transition temperature is preferably −60° C. to 20° C., more preferably −55° C. to 15° C., and still more preferably −50° C. to 10° C. When the glass transition temperature (Tg) of the acrylic resin is within the above range, the washing resistance and the crack resistance tend to be excellent.

The content (solid content) of the acrylic resin is preferably 0.5% by mass to 10% by mass and more preferably 0.5% by mass to 5% by mass with respect to the total amount of the ink composition. When the content of the acrylic resin is 10% by mass or less, ink reliability (such as clogging or discharge stability) is further improved and appropriate physical properties (such as viscosity) as ink tend to be obtained. On the other hand, when the content of the acrylic resin is 0.5% by mass or more, the fixability of the ink composition on the medium to be recorded is further improved and the abrasion resistance of an image to be obtained tends to be further improved.

Urethane Resin

The urethane resin is not particularly limited and examples thereof include anionic urethane resins such as polycarbonate-based resin and polyether-based resin. Such urethane resin is not particularly limited and can be synthesized by known methods. For example, the urethane resin can be obtained by allowing a compound having two or more isocyanate groups to react with a compound having two or more active hydrogen groups.

In general, since main chains of the urethane resin are moderately bonded to each other by hydrogen bonding, a flexible and tough film structure can be formed. By using the urethane resin, a flexible film structure can be formed while spreading out over a recording medium in a state in which the fluidity is maintained at a temperature at which common ink jet printing is performed (10° C. to 40° C.) Thus, abrasion resistance is improved. In addition, since a medium generally used for printing (for example, ink jet exclusive recording paper "OHP sheet", manufactured by Seiko Epson Corporation) is generally charged positive in many cases, by using the anionic urethane resin as a fixing resin of ink, the attachment is improved by the electrostatic interaction. Further, since the polyether-based or the polycarbonate-based urethane resin is likely to form a highly flexible film as compared to that which is formed, for example, by the polyester-based urethane resin, the abrasion resistance of an image to be obtained tends to be improved. Furthermore, since being unlikely to be deteriorated by water, the polyether-based or the polycarbonate-based urethane resin is preferably used in an aqueous ink.

The compound having two or more isocyanate groups is not particularly limited and examples thereof include chain aliphatic isocyanates, such as tetramethylene diisocyanate, 1,6-hexamethylene diisocyanate, dodecamethylene diisocyanate, trimethylhexamethylene diisocyanate, and lysine diisocyanate; aliphatic isocyanates having a cyclic structure, such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, and 3,3'-dimethyl-4,4'-dicyclohexylmethane diisocyanate; and aromatic isocyanates, such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, and tetramethylxylylene diisocyanate. The compounds having two or more isocyanate groups may be used singly or in a combination of two or more kinds thereof.

The compound having two or more active hydrogen groups is not particularly limited and examples thereof include polyether polyols, and polycarbonate polyols.

The polyether polyols are not particularly limited and examples thereof include polyethylene glycol, polypropylene glycol, and polytetramethylene glycol. The polyether polyols may be used singly or in a combination of two or more kinds thereof. The polyether polyols can be obtained by performing ring-opening polymerization of one or two or more cyclic ether compounds using a compound having active hydrogen atoms as a catalyst. Here, the cyclic ether compound used in the ring-opening polymerization is not particularly limited and examples thereof include ethylene oxide, propylene oxide, butylene oxide, styrene oxide, tetrahydrofuran, and epichlorohydrine.

The polycarbonate polyols are not particularly limited and can be obtained by allowing diols to react with dialkyl carbonates or cyclic carbonates. The polycarbonate polyols may be used singly or in combination of two or more kinds thereof. The diols are not particularly limited and examples thereof include 1,3-propanediol, 1,4-butanediol, 1,6-hexanediol, diethylene glycol, polyethylene glycol, polypropylene glycol, and polytetramethylene glycol. The dialkyl carbonates are not particularly limited and examples thereof include phosgene, and dimethyl carbonate. The cyclic carbonates are not particularly limited and examples thereof include ethylene carbonate.

In addition, in order to enable a urethane resin to have anionic properties, for example, a monomer having a carboxyl group, a sulfone group, or the like may be introduced. Examples of the monomer as described above include a monohydroxy carboxylic acid, such as lactic acid; dihydroxy carboxylic acid, such as α,α-dimethylolacetic acid, α,α-dimethylolpropionic acid, or α,α-dimethylolbutylic acid; or a diamino sulfonic acid, such as 3,4-diaminobutane sulfonic acid or 3,6-diamino-2-toluene sulfonic acid.

As the urethane resin, resins obtained by known methods and production methods may be used and commercially available products may be used. Commercially available products are not particularly limited and examples thereof include WBR-601U (manufactured by Taisei Fine Chemical Co., Ltd.), TAKELAC W-512A6, TAKELAC W-6021, and TAKELAC W-6061 (manufactured by Mitsui Chemicals, Inc.), and WBR-016U (manufactured by Taisei Fine Chemical Co., Ltd.).

When the urethane resin is used as the resin included in the resin dispersion, the glass transition temperature (Tg) thereof is not particularly limited. However, the glass transition temperature is preferably −60° C. to 70° C., more preferably −60° C. to 0° C., and still more preferably −60° C. to −10° C. When the glass transition temperature is within the above range, a pigment such as a metal compound can be strongly fixed onto the medium to be recorded, and thus, the abrasion resistance of an image to be obtained tends to be improved. Particularly, when the glass transition temperature of the urethane resin is 0° C. or lower, the intermittent printing properties are further improved, and nozzle missing or the like occurring during ink jet recording tends to be suppressed.

When the urethane resin is of an emulsion type, the average particle size of the urethane resin is preferably 50 nm to 200 nm, and more preferably 60 nm to 200 nm. When the average particle size of the urethane resin is within the above range, the urethane resin particles can be uniformly dispersed in the ink composition.

When the urethane resin is used as the resin included in the resin dispersion, the content (solid content) thereof is preferably 0.5% by mass to 10% by mass, and more preferably 0.5% by mass to 5% by mass with respect to the total amount of the ink composition. When the content of the urethane resin is 10% by mass or less, ink reliability (such as clogging or discharge stability) is further improved and appropriate physical properties (such as viscosity) as ink tend to be obtained. On the other hand, when the content is 0.5% by mass or more, the fixability of the ink composition on the medium to be recorded is further improved and thus, the abrasion resistance of an image to be obtained tends to be further improved.

Other Resins

Resins other than the acrylic resin and the urethane resin are not particularly limited and for example, a homopolymer or a copolymer of acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, or vinylidene chloride, fluorine resin, natural resin, or the like is used. In addition, the above copolymer can be in any form of a random copolymer, a block copolymer, an alternate copolymer, and a graft copolymer. Among other resins, resins other than the acrylic resin and the urethane resin obtained by polymerization using a monomer having at least a vinyl group are vinyl-based resins.

As resins other than the acrylic resin and the urethane resin, resins obtained by known materials and known production methods may be used and commercially available products may be used. Commercially available products are not particularly limited and examples thereof include Movinyl 180E (manufactured by Nippon Synthetic Chemical Industry Co., Ltd.). However, commercially available products are not limited to the above examples.

The content of the resin included in the resin dispersion in the first ink composition is 0.5 parts by mass to 2.5 parts by mass with respect to 1 part by mass of the pigment, and the lower limit is preferably 0.7 parts by mass or more, more preferably 1 part by mass or more, and still more preferably 1.5 parts by mass or more. The upper limit is preferably 2.3 parts by mass or less, and more preferably parts by mass or less. When the content of the resin included in the resin dispersion in the first ink composition is 0.5 parts by mass or more, the washing resistance of an image to be obtained is more excellent. In addition, when the content of the resin included in the resin dispersion in the first ink composition is 2.5 parts by mass or less, cracks are unlikely to be generated. When the content of the resin included in the resin dispersion in the first ink composition is 0.5 parts by mass or more, generally, cracks tend to be generated, and thus, the application of the invention is particularly advantageous.

The content of the resin included in the resin dispersion in the first ink composition is preferably 3.5% by mass to 30% by mass with respect to the total amount of the first ink composition, and the lower limit is more preferably 5.0% by mass or more, and still more preferably 7.0% by mass or more. The upper limit is more preferably 25% by mass or less, still more preferably 20% by mass or less, and particularly preferably 15% by mass or less. When the content of the resin included in the resin dispersion in the first ink composition is 3.5% by mass or more, the fixability of the first ink composition to the medium to be recorded is improved and the abrasion resistance and washing resistance of an image to be obtained tend to be further improved. In addition, when the content of the resin included in the resin dispersion in the first ink composition is 30% by mass or less, the crack resistance tends to be excellent.

The glass transition temperature (Tg) of the resin included in the resin dispersion in the first ink composition is preferably $-60°$ C. to $20°$ C., more preferably $-45°$ C. to $10°$ C., and still more preferably $-45°$ C. to $0°$ C. Tg of the above-described acrylic resin or urethane resin may be within the above range. When the glass transition temperature of the resin included in the resin dispersion in the first ink composition is $10°$ C. or lower, the abrasion resistance of an image to be obtained tends to be further improved. In addition, when the glass transition temperature of the resin included in the resin dispersion in the first ink composition is $-60°$ c. or higher, the fixability tends to be further improved. The glass transition temperature can be changed by changing at least one of the type and constitution ratio of a monomer, a compound having two or more isocyanate groups, a compound having two or more active hydrogen groups, or the like, constituting the resin used when the resin is obtained by polymerization, polymerization conditions, and resin modification. The polymerization conditions include a temperature during polymerization, the type of a catalyst including a monomer, the density of a monomer in a catalyst, and the type or the amount of a polymerization initiator or a catalyst used during polymerization. The glass transition temperature can be measured by differential scanning calorimetry (DSC method) according to JIS K7121. When the resin includes one or more of the above acrylic resin and urethane resin, a total content of these resins may be the above resin content. Further, when the resin included in the ink is the acrylic resin or the urethane resin, the glass transition temperature of the acrylic resin or the urethane resin may be the above resin glass transition temperature.

Organic Solvent Having Boiling Point of 250° C. or Higher

The first ink composition preferably further includes an organic solvent having a boiling point of 250° C. or higher. When the organic solvent having a boiling point of 250° C. or higher is included in the ink composition, the drying rate of the ink composition on the medium to be recorded is relatively slowed down. Thus, volume contraction of the solid content in the ink composition is slowed down and cracks tend to be hardly generated.

The organic solvent having a boiling point of 250° C. or higher is not particularly limited and examples thereof include polyol compounds such as glycerin (boiling point: 290° C.), triethylene glycol (boiling point: 285° C.), and triethylene glycol monobutyl ether (boiling point: 278° C.) Among these examples, glycerin is preferable. In addition to the above effect, the discharge stability tends to be improved by using glycerin.

The content of the organic solvent having a boiling point of 250° C. or higher in the first ink composition is preferably 3% by mass to 50% by mass with respect to the total amount of the ink composition. The lower limit is more preferably 5% by mass or more and the upper limit is more preferably 30% by mass or less, and still more preferably 20% by mass or less. When the content is equal to or more than the above lower limit, crack generation tends to be further suppressed, and when the content is equal to or less than the above upper limit, the discharge stability tends to be further improved.

The first ink composition may include an organic solvent having a boiling point lower than 250° C. within a range not hindering the effect of the invention. The organic solvent having a boiling point lower than 250° C. is not particularly limited and examples thereof include hydrocarbon-based solvents, such as toluene, hexane, cyclohexane, benzene, octane, and isooctane; ester-based solvents, such as ethyl acetate, butyl acetate, and γ-butyrolactone; ketone-based solvents, such as acetone, methyl ethyl ketone, methyl isobutyl ketone, and cyclohexanone; alcohol-based solvents, such as methanol, ethanol, propanol, isopropanol, butanol, and propylene glycol; hallogen-based solvents, such as dichloroethane, and chloroforman; ether-based solvents, such as diethyl ether, and tetrahydrofuran; amide-based solvents, such as N,N-dimethylformamide, N,N-dimethylacetamide, N-methyl-2-pyrrolidone, N-ethyl-2-pyrrolidone, N-methyl-ε-caprolactam, and hexamethyl phosphoramide; and water-soluble organic solvents.

Water

The first ink composition may include water. Examples of the water include pure water and ultrapure water, such as ion-exchanged water, ultra-filtered water, reverse osmosis water, and distilled water, from which ionic impurities are removed as much as possible. In addition, if water subjected to sterilization treatment by ultraviolet irradiation or hydrogen peroxide addition is used, funguses and bacteria can be prevented from being generated when the ink composition is stored for over a long period of time. Thus, the storage stability tends to be further improved. The content of the water is preferably 60% by mass to 90% by mass, and more preferably 70% by mass to 80% by mass with respect to the total amount of the ink composition.

Surfactant

The ink composition used in the embodiment preferably includes a surfactant. The surfactant is not particularly limited. For example, as the surfactant, at least any of acetylene glycol-based surfactants, fluorine-based surfactants, and silicone-based surfactants, are preferably used. When the ink composition includes these surfactants, more favorable wettability and drying properties of the ink composition attached to the medium to be recorded are achieved and thus, high speed printing becomes possible.

Among these examples, silicone-based surfactants are more preferable since the solubility into the ink composition is increased and foreign substances in the ink composition is more unlikely to be generated.

The acetylene glycol-based surfactants are not particularly limited and for example, one or more materials selected from 2,4,7,9-tetramethyl-5-decyne-4,7-diol, alkylene oxide adducts of 2,4,7,9-tetramethyl-5-decyne-4,7-diol, 2,4-dimethyl-5-decyne-4-ol, and alkylene oxide adducts of 2,4-dimethyl-5-decyne-4-ol are preferably used. Commercially available products of the acetylene glycol-based surfactants are not particularly limited and examples thereof include Olfine 104 series and Olfine E series including E1010 (trade names, manufactured by Air Products Japan, Inc.) and Surfynols 465 and 61 (trade names, manufactured by Nissin Chemical Industry Co., Ltd.). The acetylene glycol-based surfactants may be used singly or in combination of two or more kinds thereof.

The fluorine-based surfactants are not particularly limited and examples thereof include perfluoroalkyl sulfonate, perfluoroalkyl carboxylate, perfluoroalkyl phosphoric acid ester, perfluoroalkyl ethylene oxide adducts, perfluoroalkyl betaine, and perfluoroalkyl amine oxide compounds. Commercially available products of the fluorine-based surfactants are not particularly limited and examples thereof include S-144 and S-145 (manufactured by ASAHI GLASS CO., LTD.); FC-170C, FC-430, and Fluorad-FC4430 (manufactured by Sumitomo 3M Limited); FSO, FSO-100, FSN, FSN-100, and FS-300 (manufactured by DuPont); and FT-250 and 251 (manufactured by NEOS COMPANY LIMITED). The fluorine-based surfactants may be used singly or in combination of two or more kinds thereof.

Examples of the silicone-based surfactants include polysiloxane-based compounds and polyether modified organosiloxane. Commercially available products of the silicone-based surfactants are not particularly limited. Specific examples of the silicone-based surfactants include BYK-306, BYK-307, BYK-333, BYK-341, BYK-345, BYK-346, BYK-347, BYK-348, BYK-349 (the above are trade names, manufactured by BYK-Chemie Japan, Inc.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the above are trade names, manufactured by Shin-Etsu Chemicals Co., Ltd.).

The content of the surfactant is preferably 0.1% by mass to 5% by mass, and more preferably 0.1% by mass to 3% by mass with respect to the total amount of the ink composition. When the content of the surfactant is within the above range, the wettability of the ink composition attached to the medium to be recorded tends to be improved.

Other Components

In order to maintain favorable storage stability and discharge stability from a head, improve clogging, and prevent deterioration of the ink composition, various additives such as a solubilizing aid, a viscosity adjusting agent, a pH adjusting agent, an antioxidant, a preservative, a fungicide, a corrosion inhibitor, and a chelating agent for catching metal ions that affect dispersion can be appropriately added to the ink composition used in the embodiment.

Second Ink Composition

A second ink composition includes one or more components selected from the group consisting of a pigment, a resin dispersion, and an arbitrary component. The above-described pigments may be used as a color pigment and a black pigment, and thus, description thereof will be omitted here.

Organic Solvent Having Boiling Point of 250° C. or Higher

The second ink composition preferably includes an organic solvent having a boiling point of 250° C. or higher. When the second ink composition includes the organic solvent having a boiling point of 250° C. or higher and preferably, the first ink composition includes the organic solvent having a boiling point of 250° C. or higher, the difference between the drying rate of the first ink composition and the draying rate of the second ink composition is decreased. Thus, when recording is performed on the background image recorded by the first ink composition using the second ink composition, crack generation tends to be suppressed.

The content of the organic solvent having a boiling point of 250° C. or higher in the second ink composition is preferably within the above range of the organic solvent in the first ink composition.

The second ink composition may include the same arbitrary component as in the first ink composition except that any one of the color pigment and the black pigment is necessarily included in the second ink composition as an essential component.

Reaction Solution

The reaction solution preferably includes one or more flocculants selected from the group consisting of a polyvalent metal salt and an organic acid. When the reaction solution including the flocculant is used, it is possible to prevent that the pigment included in the first ink composition and the pigment included in the second ink composition are flocculated and the pigments infiltrate into the medium to be recorded. Thus, the color developability of an image to be obtained is further improved and bleeding and solid unevenness tend to be further suppressed. When the reaction solution, particularly the reaction solution including the polyvalent metal salt, is used, cracks resulting from the flocculation of the pigment in the ink composition tend to be easily generated, and thus, the use of the invention is particularly advantageous.

Polyvalent Metal Salt

The polyvalent metal salt is not particularly limited and for example, polyvalent metal salts of inorganic acids or polyvalent metal salts of organic acids are preferable. Such polyvalent metal salts are not particularly limited and examples thereof include salts of group 2 alkali earth metals of the periodic table (for example, magnesium and calcium), group 3 transition metals of the periodic table (for example, lanthanum), group 13 earth metals of the periodic table (for example, aluminum), and lanthanides (for example, neodymium). As these polyvalent metal salts, carboxylate (formic acid, acetic acid, benzoate, or the like), sulfate, nitrate, chloride, and thiocyanate are preferable. Among the above, calcium salts or magnesium salts of carboxylic acids (formic acid, acetic acid, benzoate, or the like), calcium salts or magnesium salts of sulfuric acids, calcium salts or magnesium salts of nitric acids, calcium chloride, magnesium chloride, and calcium salts or magnesium salts of thiocyanic acids are preferable. The above polyvalent metals and salts constituting the polyvalent metal salts may be used in combination of any two or more thereof and may be hydrates. The polyvalent metal salts may be used singly or in combination of two or more kinds thereof.

The content of the flocculant is preferably 0.5% by mass to 20% by mass, more preferably 1% by mass to 15% by mass, and still more preferably 3% by mass to 13% by mass with respect to 100% of the total mass of the reaction solution. When the content of the polyvalent metal salt is within the above range, the concealment of a recorded matter to be obtained tends to be more excellent.

Organic Acid

The organic acid is not particularly limited and examples thereof include phosphoric acid, oxalic acid, malonic acid, succinic acid, citric acid, and acetic acid. Among these examples, monovalent or divalent or higher carboxylic acid is preferable. When such carboxylic acid is included, the bleed resistance of a recorded matter to be obtained tends to be more excellent. The organic acids may be used singly or in combination of two or more kinds thereof. In addition, the organic acid may be used in a state of being a salt. An organic acid salt is not particularly limited and examples thereof include salts of the above organic acids (however, salts of the above organic acids do not overlap with the above polyvalent metal salts). The salts of the above organic acids are not particularly limited and examples thereof include sodium acetate. The organic acid salts may be used singly or in combination of two or more kinds thereof.

When the ink composition includes at least one of the polyvalent metal salt and the organic acid as the flocculant, a total content thereof may be the content of the above-described flocculant.

As long as the reaction solution includes the flocculant, the same arbitrary component as in the first ink composition can be included in the reaction solution.

Ink Jet Recording Apparatus

An ink jet recording apparatus according to an embodiment is not particularly limited as long as the ink jet recording apparatus performs recording by the above-described ink jet recording method and may have the same configuration as in the related art except that the ink jet recording apparatus has the above-described configuration.

FIGURE is an example of a block diagram showing an overall configuration of the ink jet recording apparatus (as a whole) according to the embodiment. An ink jet printer 1 includes a transport unit 20, a carriage unit 30, a head unit 40, a sensor group 50, and a controller 60. The ink jet printer 1 that has received a print signal PRT from a computer 110, which has a display device 120, controls each of the units by using the controller 60 to perform recording on the medium to be recorded. The controller 60 has a unit control circuit 64, a CPU 62, a memory 63, and an interface section 61. The head unit 40 has the above-described head and discharge mechanism, and the controller 60 controls the head unit 40 to control discharge frequency, the amount of ink, or the like during recording. The carriage unit moves the head in a main scanning direction. The transport unit transports a medium to be recorded to a transport direction.

The ink jet recording apparatus can perform the above-described first to third attachment processes in such a manner that the ink composition is discharged from the nozzles in the head unit 40 by a known method and is attached to the medium to be recorded. In addition, the ink jet recording apparatus may include a roller for applying the reaction solution, a spray for ejecting the reaction solution, a nozzle for discharging the reaction solution, or the like, as a unit for applying the reaction solution to the medium to be recorded. Further, the ink jet recording apparatus may include an oven, a hot plate, and a steam spraying unit as a unit for heating and drying the medium to be recorded. The heating and drying process may be performed using an apparatus performing a heat press method separately.

The ink jet recording apparatus according to the embodiment is preferably a serial type printer. However, there is no particular limitation thereto. As long as the apparatus is a serial type printer in which the number of scans can be increased, it is possible to easily perform adjustment to increase or decrease the attachment amount.

EXAMPLES

Hereinafter, the invention will be described in detail below using examples and comparative examples. The invention is by no means limited to the following examples.
Material for Ink Composition The main materials for the ink compositions used in the examples and comparative examples below are as follows.
Pigment
  Titanium dioxide (NanoTek® Slurry, manufactured by C.I. Kasei CO., LTD., average particle size: 250 nm)
  Cyan Pigment (C.I. Pigment Blue 15:3)
Resin Dispersion
  Resin dispersion 1 (WBR-601U, Tg: −30° C., manufactured by TAISEI FINE CHEMICAL CO., LTD., urethane resin)
  Resin dispersion 2 (Movinyl 7320, Tg: −20° C., manufactured by The Nippon Synthetic Chemical Industry Co., Ltd., acrylic resin)
  Resin dispersion 3 (TAKELAC W-512A6, Tg: 2° C., manufactured by Mitsui Chemicals, Inc., urethane resin)
  Resin dispersion 4 (UC-3510, Tg: −50° C., manufactured by Toagosei Company Limited, acrylic resin)
  Resin dispersion 5 (TAKELAC W-6021, Tg: −60° C., manufactured by Mitsui Chemicals, Inc., urethane resin)
  Resin dispersion 6 (Vinyblan 2080, Tg: 8° C., manufactured by Nissin Chemical Industry CO., Ltd., acrylic resin)
  Resin dispersion 7 (Movinyl 180E, Tg: −15° C., manufactured by The Nippon Synthetic Chemical Industry Co., Ltd., vinyl acetate/ethylene resin)
Organic Solvent
  Glycerin (boiling point: 290° C.)
  Triethylene glycol (boiling point: 285° C.)
  Triethylene glycol monobutyl ether (boiling point: 278° C.)
  Propylene glycol (boiling point: 188° C.)
Surfactant
  BYK-348 (manufactured by BYK-Chemie Japan, Inc., silicone-based surfactant)

Material for Reaction Solution

Polyvalent Metal Salt

Magnesium sulfate 7 hydrate (molecular weight: 246.47 g/mol)

Organic Acid

Succinic acid (molecular weight: 118.09 g/mol)

Preparation of Ink Composition and Reaction Solution

Each material was mixed according to the composition (% by mass) of the following Tables 1 and 2, sufficiently stirred, and thus, reaction solutions and first and second ink compositions were respectively obtained.

TABLE 1

| Ink composition No. | Resin Tg/Solvent boiling point | 1 | 2 | 3 | 4 | 5 | 6 | 11 | 12 | 13 | 14 | 15 | 7 | 8 | 9 | 10 | 16 |
|---|---|---|---|---|---|---|---|---|---|---|---|---|---|---|---|---|---|
| Titanium dioxide pigment (pigment solid content) | — | 8.00 | 5.00 | 8.00 | 8.00 | 13.00 | 8.00 | 8.00 | 8.00 | 8.00 | 8.00 | 8.00 | 8.00 | | | 8.00 | 8.00 |
| Cyan pigment (pigment solid content) | — | | | | | | | | | | | | | 2.00 | 2.00 | | |
| Resin dispersion 1 (resin solid content) | −30 | 8.00 | 5.00 | 3.00 | 21.00 | 13.00 | | | | | | | 8.00 | 2.00 | 2.00 | 6.00 | |
| Resin dispersion 2 (resin solid content) | −20 | | | | | | 8.00 | | | | | | | | | | |
| Resin dispersion 3 (resin solid content) | 2 | | | | | | | 8.00 | | | | | | | | | |
| Resin dispersion 4 (resin solid content) | −50 | | | | | | | | 8.00 | | | | | | | | |
| Resin dispersion 5 (resin solid content) | −60 | | | | | | | | | 8.00 | | | | | | | |
| Resin dispersion 6 (resin solid content) | 8 | | | | | | | | | | 8.00 | | | | | | 16.00 |
| Resin dispersion 7 (resin solid content) | −15 | | | | | | | | | | | 8.00 | | | | | |
| Glycerin b.p. 290° C. | 290 | 7.00 | 7.00 | 7.00 | 7.00 | 7.00 | 7.00 | 7.00 | 7.00 | 7.00 | 7.00 | 7.00 | | 7.00 | | 7.00 | 7.00 |
| Triethylene glycol | 285 | 3.00 | 3.00 | 3.00 | 3.00 | 3.00 | 3.00 | 3.00 | 3.00 | 3.00 | 3.00 | 3.00 | | 3.00 | | 3.00 | 3.00 |
| Triethylene glycol monobutyl ether | 278 | 1.00 | 1.00 | 1.00 | 1.00 | 1.00 | 1.00 | 1.00 | 1.00 | 1.00 | 1.00 | 1.00 | | 1.00 | | 1.00 | 1.00 |
| Propylene glycol b.p. 188° C. | 188 | | | | | | | | | | | | 15.00 | | 15.00 | | |
| BYK-348 | | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 | 0.30 |
| Ion-exchanged water | | Residual amount | Residual amount | Residual amount | Residual amount | Residual amount | Residual amount | Residual amount | Residual amount | Residual amount | Residual amount | Residual amount | Residual amount | Residual amount | Residual amount | Residual amount | Residual amount |
| Total | | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |
| Ratio of resin dispersion solid content/pigment | | 1.00 | 1.00 | 0.38 | 2.63 | 1.00 | 1.00 | 1.00 | 1.00 | 1.00 | 1.00 | 1.00 | 1.00 | 1.00 | 1.00 | 0.75 | 2.00 |
| Discharge stability | | A | A | A | A | A | A | A | A | A | A | B | B | A | B | A | A |
| Storage stability | | A | A | A | A | A | A | A | A | A | A | B | A | A | A | A | A |

TABLE 2

|  |  | Reaction solution No. | |
| --- | --- | --- | --- |
|  |  | 1 | 2 |
| Magnesium sulfate | % by mass | 10 | — |
| Succinic acid | % by mass | — | 10 |
| byk348 | % by mass | 0.2 | 0.2 |
| Ion-exchanged water | % by mass | Residual amount | Residual amount |
| Total | % by mass | 100 | 100 |

Ink Jet Recording Method (Examples 1 to 19 and Comparative Examples 1 to 3)

Preparation of Recorded Matter for Evaluation Sample

A T-shirt (Heavy Weight, manufactured by Hanesbrands Inc., 100% cotton) of black color cloth was used as a medium to be recorded. As the reaction solution application process, the reaction solution in Table 3 was applied to the medium to be recorded with a roller in an application amount of 20 g per A4 paper size. After the application, the mass of the fabric was measured and the product was heated and dried so as to have the residual rate of a volatile component in the reaction solution shown in the Table by the following expressions. At the residual rate, ink attachment started.

Residual amount of volatile component $(A-Ae)$=Total amount of volatile component $(Af-Ae)$-Volatilization amount of volatile component $(Af-A)$ Residual rate of volatile component (%)=(Residual amount of volatile component $(A-Ae)$/Total amount of volatile component $(Af-Ae)$)×100 wherein Af indicates a total mass of the reaction solution applied per unit area, Ae indicates a mass of a solid content in the reaction solution applied per unit area, and A indicates a residual mass of the reaction solution per unit area when the ink composition attachment started.

Af was obtained from a difference between the mass of the fabric before the reaction solution application and the mass of the fabric immediately after the application as the amount of the reaction solution applied. A was obtained from a difference between the mass of the fabric at the time of starting ink composition application and the mass of the fabric before the reaction solution application. When the amount of the volatile component volatized was measured, a medium to be recorded prepared for measurement was used. An electronic balance was used in the measurement. During the measurement, the relationship between the drying time from when the reaction solution was applied to when the reaction solution was heated to a predetermined temperature and dried by a platen, and the volatilization amount was obtained in advance and when recording was performed by the recording apparatus, the time from when the reaction solution was applied to when the ink composition was applied was set to any time in the above-obtained relationship between the drying time and the volatilization amount. Thus, a desired volatilization amount was achieved.

After the reaction solution application process, as the first attachment process and the following second attachment process, each ink composition shown in Table 3 was attached to record a 10 cm×10 cm pattern on the medium to be recorded with an ink jet printer SC-S30650 (manufactured by SEIKO EPSON CORPORATION) at a recording resolution of 1200×1200 dpi so as to prepare recorded matters for evaluation sample. In the first attachment process and the second attachment process, the ink composition was attached in separate regions of the medium to be recorded. After the ink composition was attached, the product was heated and dried at 170° C. for 1 hour with a heat press machine. It is also possible to perform the first attachment process and the second attachment process independently.

In Example 16, the ink composition was attached directly to the medium to be recorded without performing the reaction solution application process. In addition, in Examples 11 to 14, each recorded matter for evaluation sample was prepared such that each ink composition shown in Table 3 was attached to the recorded region formed by the second attachment process as the third attachment process to record a 5 cm×5 cm pattern. Hereinafter, each evaluation item will be described. The evaluation results are shown in Table 3.

Washing Resistance

Each recorded matter for evaluation sample was stirred in warm water of 40° C. for 30 minutes using a washing machine (fully automatic washing machine (AW-424V6 type), manufactured by TOSHIBA CORPORATION). After the stirring, each recorded matter for evaluation sample was visually observed and the washing resistance was evaluated based on the following evaluation criteria. In Examples 11 to 14, whether or not cracks were generated in the recorded region formed by the third attachment process was evaluated.

A: The coating film of the evaluation sample is not peeled off.

B: A part of the coating film of the evaluation sample is peeled off and the base is exposed at less than 30% of the pattern.

C: Most of the coating film is peeled off and the base is exposed at 30% or more of the pattern.

Cracks

The surface of the recorded region of each recorded matter for evaluation sample was visually observed and crack generation was evaluated based on the following evaluation criteria. In Examples 11 to 14, whether or not cracks were generated in the recorded region formed by the third attachment process was evaluated.

A: No crack is generated.

B: Cracks are observed but the base is not exposed.

C: Cracks are observed and the base is remarkably exposed.

Concealment of Image

An L* value of the recorded region of each recorded matter for evaluation sample formed by the second attachment process was obtained using a commercially available colorimeter (Gretag Macbeth Spectrolino, manufactured by X-Rite, Inc.). The concealment of the image was evaluated based on the obtained L* value.

A: L* value is 90 or more.

B: L* value is 70 or more and less than 90.

C: L* value is less than 70.

Discharge Stability

An ink jet printer SC-S30650 (manufactured by SEIKO EPSON CORPORATION) was filled with each ink composition and whether all nozzles discharged the ink composition normally was checked. Then, the nozzles were inspected after the head was capped and stopped at 25° C. for 1 week, and the number of non-discharging nozzles among all of 360 nozzles was checked.

A: The number of non-discharging nozzles is 3 or less.

B: The number of non-discharging nozzles is 4 or more.

Storage Stability

The viscosity of each ink composition immediately after the ink composition was prepared, and the viscosity of each ink composition after the ink composition was put into a glass container, sealed and stored at 40° C. for 7 days was measured at 25° C. using a viscoelasticity testing machine MCR-30 (manufactured by Paar Physica). A viscosity increase rate was calculated from a difference between the viscosity after the storage and the viscosity before the storage relative to the viscosity before the storage, and the storage stability was evaluated based on the following criteria.

A: The viscosity increase rate was 3% or less.
B: The viscosity increase rate was more than 3%

Abrasion Resistance Evaluation

The pattern obtained in the second attachment process, but only in the cases of Examples 11 to 14, the pattern formed by the third attachment process, on the recorded matter was subjected to a friction fastness test (load: 200 g, reciprocation: 100 times) according to a method of friction tester type II of JIS L0849 with a Gakushin-type rubbing tester AB-301 (manufactured by Tester Sangyo Co., Ltd.). Black cotton broad cloth (100% cotton) was used as the abrading cloth. The surface of the pattern after the fraction was visually observed.

A: Spots where the ink of the pattern is peeled off and the base is exposed are not observed.
B: Spots where the ink of the pattern is peeled off and the base is exposed are observed.

was deteriorated. Further, in the recorded matter obtained in Comparative Example 3, the ratio of the solid content of the resin dispersion and the pigment was too large, and thus, it was found that cracks were generated in the recorded region formed in the second attachment process.

It was found that the content of the pigment in the ink composition was high and as a result, the washing resistance of the recorded region formed in the first attachment process was improved and the concealment of the recorded region formed in the second attachment process was improved in other examples compared to Example 2. In addition, it was found that the content of the pigment in the ink composition was low and as a result, the washing resistance and the abrasion resistance of the recorded region formed in the second attachment process were improved in other examples compared to Example 3.

It was found that Tg of the resin dispersion in the ink composition was low and as a result, the washing resistance of the recorded region formed in the first attachment process was improved and cracks in the recorded region formed in the second attachment process were reduced in other examples compared to Examples 5 and 8.

It was found that Tg of the resin dispersion in the ink composition was high and as a result, the abrasion resistance of the recorded region formed in the second attachment

TABLE 3

| | | Example | | | | | | | | | | | | | | | | | | | Comparative Example | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 1 | 2 | 3 |
| Reaction solution application process | Reaction solution No. | 1 | 1 | 1 | 1 | 1 | 1 | 1 | 1 | 1 | 1 | 1 | 1 | 1 | 1 | 2 | — | 1 | 1 | 1 | 1 | 1 | 1 |
| | Residual rate of volatile component | 5 | 5 | 5 | 5 | 5 | 5 | 5 | 5 | 5 | 5 | 5 | 5 | 5 | 5 | 5 | 70 | 5 | 5 | 5 | 5 | 5 |
| First attachment process | Ink No. | 1 | 2 | 5 | 6 | 11 | 12 | 13 | 14 | 15 | 1 | 1 | 1 | 1 | 7 | 1 | 1 | 1 | 10 | 16 | 1 | 3 | 4 |
| | Attached amount (mg/inch$^2$) | 20 | 20 | 20 | 10 | 10 | 10 | 10 | 10 | 10 | 10 | 10 | 10 | 10 | 10 | 10 | 10 | 20 | 20 | 10 | 5 | 20 | 20 |
| | Washing resistance | A | B | A | A | B | A | A | B | A | A | A | A | A | A | A | A | A | B | A | C | C | A |
| | Cracks | A | A | A | A | A | A | A | A | A | A | A | A | A | A | A | A | A | A | A | A | A | A |
| Second attachment process | Ink No. | 1 | 2 | 5 | 6 | 11 | 12 | 13 | 14 | 15 | 1 | 1 | 1 | 1 | 7 | 1 | 1 | 1 | 10 | 16 | 1 | 3 | 4 |
| | Attached amount (mg/inch$^2$) | 200 | 200 | 200 | 250 | 250 | 250 | 250 | 250 | 250 | 250 | 200 | 200 | 150 | 200 | 250 | 250 | 200 | 200 | 250 | 300 | 200 | 200 |
| | Washing resistance | A | A | B | A | A | A | A | A | A | A | A | A | A | A | A | A | A | A | A | B | A |
| | Cracks | A | A | A | A | B | A | B | A | B | B | A | B | A | B | A | A | B | A | A | C | A | C |
| | Abrasion resistance | A | A | B | A | A | B | B | A | A | A | A | A | A | A | A | A | B | A | A | A | A |
| | Image concealment | A | C | A | A | A | A | A | A | A | A | — | — | — | — | B | C | A | A | A | A | A | A |
| Third attachment process | Ink No. | — | — | — | — | — | — | — | — | — | — | 8 | 9 | 9 | 8 | — | — | — | — | — | — | — | — |
| | mg/inch$^2$ | — | — | — | — | — | — | — | — | — | — | 20 | 20 | 20 | 20 | — | — | — | — | — | — | — | — |

In the recorded matter obtained in Comparative Example 1, it was found that since the amount of the ink composition attached was too small in the first attachment process, washing resistance was deteriorated, and since the attached amount was too large in the second attachment process, cracks were generated. In addition, in the recorded matter obtained in Comparative Example 2, it was found that the ratio of the resin (solid content) included in the resin dispersion to the pigment in the first ink composition was too small, and thus, the washing resistance of the recorded region formed in the first and second attachment processes process was improved and cracks were reduced in other examples compared to Examples 6 and 7.

It was found that excellent storage stability and discharge stability were achieved by using the urethane resin or the acrylic resin in other examples compared to Example 9. In addition, as Example 11 was compared to Example 14 and Example 11 was compared to Example 12, more excellent crack resistance and excellent discharge stability were achieved by using the organic solvent having a boiling point of 250° C. or higher.

From the comparison of Example 1 with Example 12, it was found that the crack resistance was deteriorated by providing the third attachment process in some cases. However, from the comparison of Example 12 with Example 13, it was found that the crack resistance was improved by reducing the attached amount of the ink composition in the second attachment process.

It was found that the concealment was improved by using the reaction solution including the polyvalent metal salt and cracks were further reduced by using the reaction solution including the organic acid in other examples compared to Example 15. Further, the concealment was improved by using the reaction solution and when the reaction solution was not used, the crack resistance was further improved in other examples compared to Example 16.

As Example 1 was compared to Example 17, it was advantageous to perform the attachment process in a state in which the residual rate of the volatile component was high from the viewpoint of the printing rate. However, the crack resistance tended to be deteriorated. When the attachment process was performed in a state in which the residual rate of the volatile component was low, the crack resistance was more excellent. It was found that the ratio of the solid content of the resin dispersion and the pigment was high, and as a result, the abrasion resistance of the recorded region formed in the second attachment process and the washing resistance of the recorded matter formed in the first attachment process were improved in other examples compared to Example 18. From the comparison of Example 19 with Example 8, the same tendency was observed.

What is claimed is:

1. An ink jet recording apparatus comprising:
a controller;
a head unit; and
an ink composition,
wherein the controller is configured to instruct the head unit to perform first attaching of the ink composition to fabric so as to have an attached amount of 15 mg/inch$^2$ to 30 mg/inch$^2$;
the controller is configured to instruct the head unit to perform second attaching of the ink composition to the fabric so as to have an attached amount of 90 mg/inch$^2$ to 250 mg/inch$^2$; and
the ink composition is a white ink and includes a pigment and a resin dispersion, and a content of a resin included in the resin dispersion is 0.5 parts by mass to 2.5 parts by mass with respect to 1 part by mass of the pigment.

2. The ink jet recording apparatus according to claim 1, wherein the pigment includes inorganic metal fine particles, and
a content of the pigment is 5% by mass to 15% by mass with respect to a total amount of the ink composition.

3. The ink jet recording apparatus according to claim 1, wherein the resin included in the resin dispersion includes a resin having a glass transition temperature of −45° C. to 0° C.

4. The ink jet recording apparatus according to claim 1, wherein the resin dispersion includes one or more resins selected from the group consisting of an acrylic resin and a urethane resin, and
the content of the resin included in the resin dispersion is 3.5% by mass to 30% by mass with respect to the total amount of the ink composition.

5. The ink jet recording apparatus according to claim 1, wherein the content of the resin included in the resin dispersion is 1.0 part by mass to 2.5 parts by mass with respect to 1 part by mass of the pigment.

6. The ink jet recording apparatus according to claim 1, wherein the ink composition further includes an organic solvent having a boiling point of 250° C. or higher.

7. The ink jet recording apparatus according to claim 1, wherein the controller is configured to instruct the head unit to perform applying a reaction solution to at least a region of the fabric to which the ink composition is attached before the first attaching of the ink composition or the second attaching of the ink composition is performed.

8. The ink jet recording apparatus according to claim 1, wherein the controller is configured to instruct a head unit to perform a third attaching of an ink composition including one or more pigments selected from the group consisting of a color pigment and a black pigment to at least a part of the region of the fabric to which the white ink is attached in the second attaching.

9. The ink jet recording apparatus according to claim 1, wherein the controller is configured to instruct the head unit to perform the second attaching of the ink composition to fabric so as to have an attached amount of 100 mg/inch$^2$ to 250 mg/inch$^2$.

10. The ink jet recording apparatus according to claim 1, wherein the content of the resin included in the resin dispersion is 2.5 parts by mass with respect to 1 part by mass of the pigment.

* * * * *